July 19, 1949.  E. H. OPPATT  2,476,901
AUTOMOBILE WINDOW SCREEN
Filed July 22, 1947

INVENTOR.
Edward H. Oppatt
BY Daniel G. Cullen
Attorney

Patented July 19, 1949

2,476,901

UNITED STATES PATENT OFFICE 2,476,901

AUTOMOBILE WINDOW SCREEN

Edward H. Oppatt, Dearborn, Mich., assignor to Detroit Cover Company, a corporation of Michigan Application July 22, 1947, Serial No. 762,745

1 Claim. (Cl. 160—369)

This application relates to automobile window screens and particularly to improvements in the arrangements used for hooking or latching a screen to an automobile body at a window.

One object of the present invention is to provide a hooking or latching arrangement in a screen construction of such a nature that the screen can be easily and quickly applied to an automobile window opening either from the exterior or the interior but preferably from the interior of the automobile, and in such a way as not to interfere with free raising and lowering of the window glass in the body.

The latching and hooking arrangement hereof is characterized by its extreme simplicity of manufacture and operation, and more especially by its neatness of appearance.

Presently preferred embodiments of the invention are here disclosed. Such embodiments may best be understood upon reference to the appended drawing. In this drawing, Fig. 1 shows a screen having one disposition of the hooking and latching arrangement.

Figure 1:
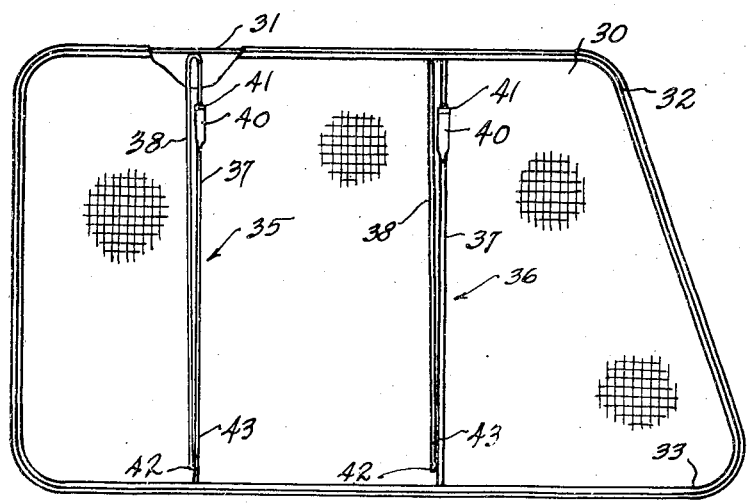

Referring to the drawing, it will be observed that it shows an automobile body construction including an outer panel 10 formed with a window opening defined by the inwardly directed flanges 11 of the body. Inside the body is a frame 12 whose marginal flange 14 cooperates with the flange 11 to form the window sliding space. An upholstering panel 15 cooperates with the frame 12 to form the interior surface of the body.

The flanges 11 and 14 are provided with decorative moldings 16—17. The upper and side edges of the window opening are formed with channels 18 lined with felt strips 19. In the felt lined channels of the sides of the opening slides a slidable window pane or glass 20, as is well known in automobile body construction. The upper edge of the window will fit into the felt lined channel 18.

The screen hereof comprises a mesh panel 30 at the top of the opening, whose edge is defined by a reinforcing frame 31 covered with a folding strip of fabric 32 stitched thereto and provided with a felt padding 33.

Figures 2, 4:
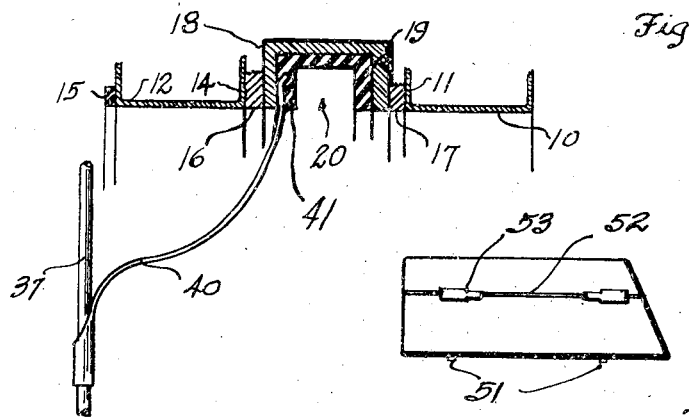
Figs. 2 and 3 are large scale fragmentary section views thereof.
Fig. 4 is a small scale view of a screen showing a second disposition of the hooking and latching arrangement.
Figure 3:
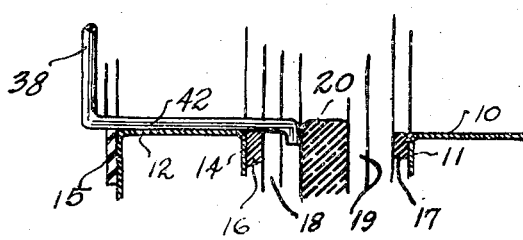

In the form of Figs. 1–3, there are shown as connecting the upper and lower portions of the reinforcing frame or wire 31, reinforcing struts referenced generally 35 and 36. Each such strut comprises two integral thin rod or wire members 37—38. Wires 37 are fixed at their ends to the upper and lower portions of the frame 31, as by welding, and slidably mounted spring clips 40 in the form of thin, wide strips of spring steel or other spring action material whose lower ends are formed as tubes surrounding the rods 37 and whose upper ends project laterally and outwardly from the rods 37 and have tips or ends 41 deflected as indicated. Welded to the upper part of frame 31 are the second rods or wires 38 whose lower ends are formed as hooks 42 which project laterally and downwardly. Rods 38 are welded to rods 37 at the points 43 indicated. Together the rods or wires form struts having lower hooks 42 and upper slidable spring clips 40. Spring clips 40 are adapted to enter any space or crevice at the upper edge of the opening, preferably that between the channel 18 and the felt liner 19 to hold the screen to the body at the window opening. Hooks 42 are adapted to enter the window sliding space at the lower edge of the opening.

In the form of Fig. 4, the lower edge of the screen has downwardly projecting hooks 51 adapted to enter the window sliding space at the lower edge of the opening. A horizontal strut 52 has on it slidable spring clips 53, like those at 40, adapted to enter any space or crevices at the sides of the opening, preferably those between the channels 18 and the felt liner strips 19.

Spring clips 40 or 53 are so tensioned as to resist deflection away from their mounting rods 37 or 52, and thus grip the window opening, to hold the screen in place.

A screen may be applied to or moved from a body at the opening, by virtue of the cooperation of the lower hooks of the screen with the lower edge of the window opening and the cooperation of the spring clips 40 or 52 with the upper or side edges of the window opening. In applying a screen, the lower hooks will first be engaged with the body after which the spring clips are slid towards the edge or edges of the window opening with which they cooperate.

It will be observed that the construction herein disclosed is characterized by extreme simplicity of use and manufacture and also by extreme neatness of appearance, particularly with respect to the spring clips employed at the ends of the reinforcing struts to releasably latch or hook the screen to the window opening. The spring clips herein disclosed represent the ultimate in simplicity and neatness of a means for such purpose.

Now having described the constructions herein disclosed, reference should be had to the claim which follows for a determination of the invention.

I claim:

An automobile window screen comprising a mesh panel having a marginal frame provided with reinforcing struts connecting its top and bottom portions, said struts having hooks projecting laterally and downwardly, and also having thin, wide spring clips slidably mounted thereon and projecting laterally and outwardly, and having deflected ends, each of said struts comprising a single wire member bent back upon itself to provide two thin rod-like legs along side each other, the bight of the member being uppermost and fixed to the upper portion of the frame, one of the two legs being longer than the other and fixed at its free lower end to the frame and slidably mounting the spring clip, and the other leg having its lower end formed as the hook, and having its lower portion free of the lower edge of the frame but secured to a lower portion of the first leg.

EDWARD H. OPPATT.

REFERENCES CITED

The following references are of record in the file of this patent:

UNITED STATES PATENTS

| Number | Name | Date |
| --- | --- | --- |
| 2,109,160 | Yurkovich | Feb. 22, 1938 |